Patented Feb. 28, 1939

2,148,920

UNITED STATES PATENT OFFICE 2,148,920

PROCESS FOR PRODUCING COMPOUNDS OF THE AZOLE SERIES

Werner Zerweck and Emil Schwamberger, Frankfort-on-the-Main-Fechenheim, Germany, assignors to General Aniline Works, Inc., New York, N. Y., a corporation of Delaware No Drawing. Application February 25, 1937, Serial No. 127,772. In Germany February 28, 1936

1 Claim. (Cl. 260—304)

Our invention relates to a process for producing compounds of the azole series of the general formula:

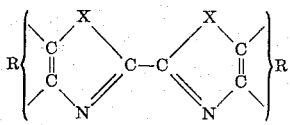

wherein R stands for a member of the group consisting of benzene, acylaminobenzene, naphthalene, anthraquinone and benzanthrone radicles and X stands for a member of the group consisting of —S—, —O— and

The present process consists in acting with a copper salt of an organic acid with or without the addition of an organic solvent in the heat on compounds of the general formula:

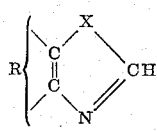

wherein R and X have the above signification, i. e. thiazoles, oxazoles and imidazoles, being unsubstituted in the 2 position of the azole ring, but containing eventually substituents in the annexed aromatic nuclei.

As copper compounds for instance copper acetate, copper butyrate and copper benzoate may be used. They may be moreover produced within the reaction mixture, for instance the butyrate may be replaced by copper carbonate and the corresponding amount of butyric acid.

For the azole compounds of the benzene series the reaction can be carried out without the addition of a solvent, but for higher condensed ring systems, for instance for anthraquinone thiazole it is an advantage to add an organic solvent of a high boiling point such as trichlorobenzene, nitrobenzene, naphthalene or chloronaphthalene.

The present reaction products are dyestuffs or intermediates. Mostly they are obtained in a pure crystallized form and may be freed from admixed copper compounds, if necessary, by treatment with warm dilute mineral acids or by recrystallization from an organic solvent.

The present products are partly obtainable according to other methods, for instance the bisthiazoles are obtainable by acting with oxalylchloride or glyoxal on the corresponding orthomercaptoamino compounds in the presence of sulfuric acid. Compared therewith our present process has the advantage of being generally applicable under mild reaction conditions, so that compounds which are attacked by oxalylchloride or sulfuric acid can be prepared. Moreover for instance anthraquinone-thiazoles, which are used as starting materials for the present process, can be manufactured in a simpler manner than the easily oxidizable mercapto-amino compounds.

In order to further illustrate our invention the following examples are given the parts being by weight and all temperatures in degrees centigrade. We wish it, however, to be understood that our invention is not limited to the particular products nor reaction conditions mentioned therein.

Example 1

A mixture of 12 parts of benzothiazole and 5 parts of the copper salt of butyric acid is boiled for a short time in an apparatus provided with a reflux condenser, then cooled down and diluted with alcohol. The precipitated reaction product is filtered off, washed out with alcohol and dried. When recrystallized from for instance chlorobenzene it forms colorless crystals melting at 305 to 306° C. It is identical with the bis-(2.2')-benzothiazolyl of the formula:

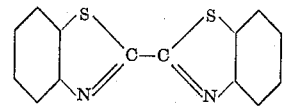

as described by Meyer-Jacobson "Lehrbuch der organischen Chemie" (1920), Vol. II, page 555.

Example 2

10 parts of benzoylamino-benzthiazole of the formula:

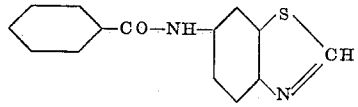

(colorless crystals, melting at about 167° C.) are heated with the addition of 70 parts of nitrobenzene at about 200° C. and while stirring 8 parts of powdered copper acetate are added. After a short time the reaction mass is cooled down and the precipitate is filtered off, washed out with alcohol and dried. The reaction product may be freed from admixed copper compounds by treatment with a warm strongly dilute acid, for instance with a nitric acid of 3% strength. The compound of the formula:

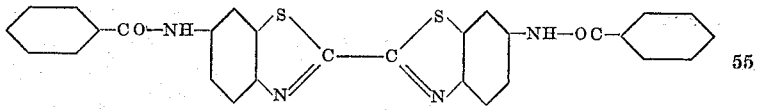

forms slightly yellow crystals melting above 360° C. soluble in concentrated sulfuric acid with a yellow color and a strong orange fluorescence.

When starting from naphthalene-1-(N)-2-thiazole (obtainable for instance by heating with formic acid 1-amino-2-thionaphthol, advantageously in the form of the zinc-mercaptide) in the same manner the bis-thiazolyl compound of the formula:

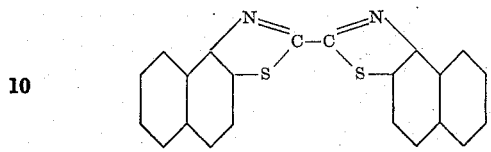

is obtained as a yellow substance melting above 300° C. soluble in sulfuric acid with a red color and showing the properties as described in literature, cf. Ber. d. Deutschen Chemischen Gas., vol. 20, page 1801.

*Example 3*

A mixture of 10 parts of benzoxazol and 5 parts of copper butyrate is boiled for some minutes in an apparatus provided with a reflux condenser, then the reaction product is isolated as described above and recrystallized from toluene.

The new 2.2'-bis-benzoxazolyl thus obtained of the formula:

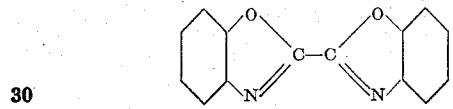

forms colorless crystals of 260° C. melting point.

*Example 4*

10 parts of anthraquinone-1.2-(N)-thiazole are dissolved in the warm in 60 parts of naphthalene. Then 5 parts of copper benzoate are added and the mixture is stirred at about 200° C. for some minutes. A yellow crystalline body separates which is filtered off, washed out and which may be purified by treatment with a warm dilute nitric acid. The condensation product of the formula:

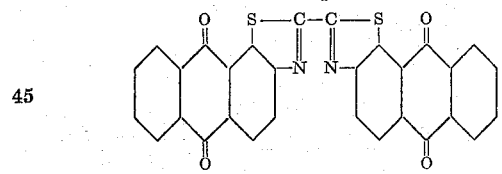

dissolves in concentrated sulfuric acid with a yellow color and dyes cotton from a violet vat greenish yellow shades. It is identical with the compound obtained by condensing 1-mercapto-2-aminoanthraquinone with glyoxalsulfate according to U. S. A. Patent No. 1,544,095.

When replacing the above anthraquinone-1.2-(N)-thiazole by the isomeric anthraquinone-2.3-(N)-thiazole, the condensation product corresponds with the formula:

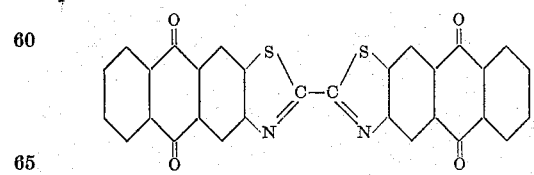

(almost colorless crystals yielding a brownish red vat) when using an anthraquinone-dithiazole of the formula:

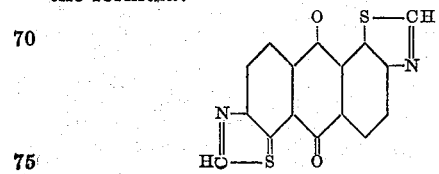

and adding as solvent chloronaphthalene a condensation product is obtained which dyes cotton from a violet vat yellowish brown shades.

*Example 5*

10 parts of a product, obtainable by acting with glycerine in the presence of sulfuric acid on anthraquinone-1.2-(N)-thiazole, being apparently a mixture of isomeric benzanthrone thiazoles, are mixed with about 100 parts of boiling nitrobenzene and subjected to the action of 5 parts of copper acetate. The condensation product which is isolated as described in the foregoing examples corresponds to the formula:

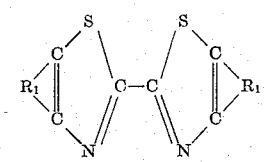

wherein $R_1$ stands for a benzanthrone system, being condensed in the 7-(N)-8 or 6-(N)-5- or 3-(N)-4-position with the thiazole ring. The new condensation product is a golden yellow crystalline substance soluble in concentrated sulfuric acid with a purple color, being insoluble in the hydrosulfite vat. When replacing the benzanthrone thiazole by an equimolecular mixture of anthraquinone-1.2-(N)-thiazole and benzanthronthiazole a golden yellow crystalline compound is obtained, soluble in the hydrosulfite vat with a violet color and dyeing cotton therefrom golden yellow shades. It may be that this compound is an asymmetrical bis-thiazole derived from a benzanthrone-thiazole and an anthraquinone thiazole.

*Example 6*

A mixture of 10 parts of anthraquinone-1.2-(N)-thiazole, about 100 parts of trichlorobenzene and 7 parts of copper propionate is heated to boiling for a short time and the reaction mass is worked up as described in Example 4. The reaction product is identical with the yellow vat dyestuff of Example 4.

The same compound is obtained by heating a dry mixture of anthraquinone-1.2-(N)-thiazole and copper formiate at about 280 to 290° C. and purifying the formed crude product by recrystallisation or by precipitating it from its solution in an alkaline hydrosulfite vat.

*Example 7*

A mixture of 6 parts of N-methyl-benzimidazole, cf. Ber. d. Deutschen Chem. Ges., vol. 22, page 644, about 60 parts of trichlorobenzene and 9 parts of copper acetate is heated to boiling for a short time. When cool the reaction mass is diluted with benzene and the reaction product separates, which is obtained by recrystallisation from pyridine as colorless crystals of 206° C. melting point. It corresponds to the formula of a N,N'-dimethyl-bis-benzimidazole:

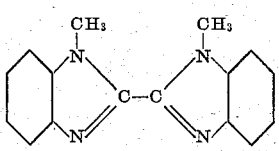

to which the analysis is in accordance.

We claim:

Process for producing compounds of the azole series of the general formula:

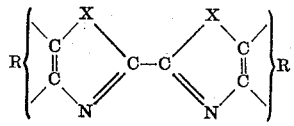

wherein R stands for a member of the group consisting of benzene, acylaminobenzene, naphthalene, anthraquinone and benzanthrone radicles and X stands for a member of the group consisting of —S—, —O— and

which process consists in acting with a copper salt of an organic carboxylic acid in the heat on compounds of the general formula:

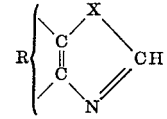

wherein R and X have the above signification.

WERNER ZERWECK.
EMIL SCHWAMBERGER.